W. N. BEST.
CHILD'S VEHICLE.
APPLICATION FILED MAY 4, 1916.
1,198,001. Patented Sept. 12, 1916.
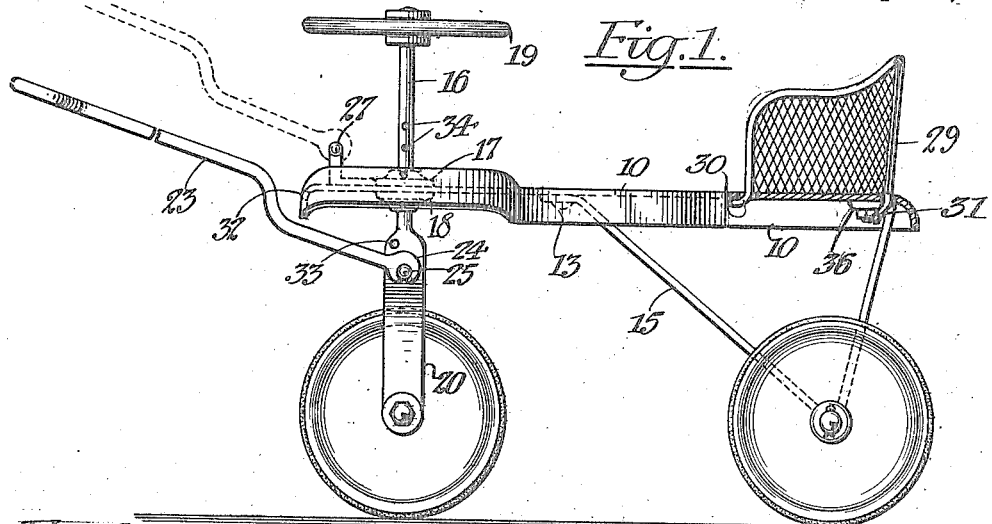
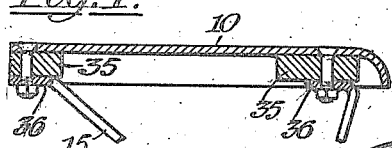
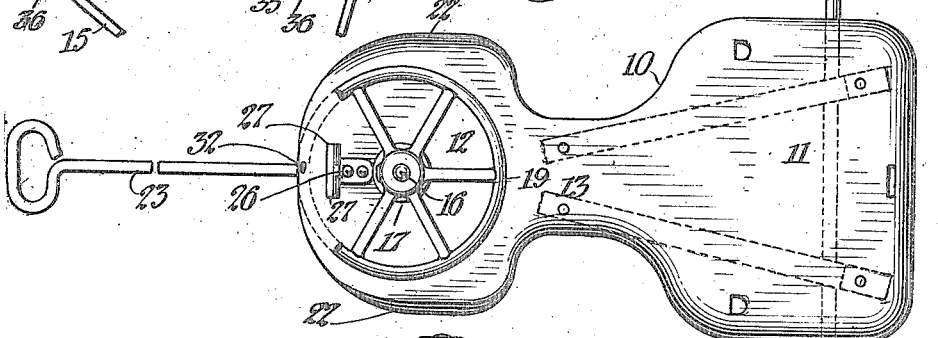
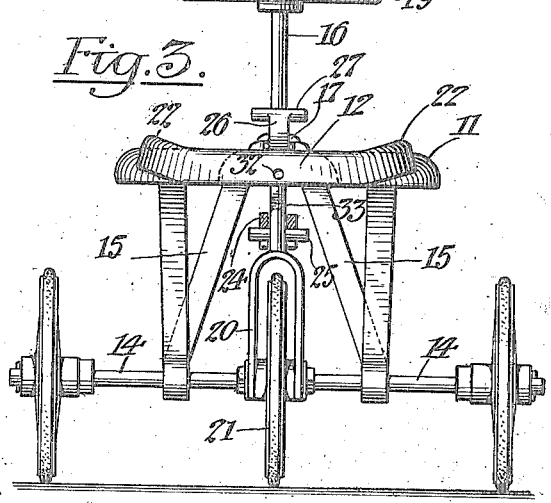

UNITED STATES PATENT OFFICE.

WILLIAM N. BEST, OF NEW YORK, N. Y., ASSIGNOR OF ONE-FOURTH TO SARAH A. MEISER, OF QUINCY, ILLINOIS, AND ONE-FOURTH TO MARGARET STELLA SPIES, OF CRESTON, ILLINOIS.

CHILD'S VEHICLE.

1,198,001.　　　　　Specification of Letters Patent.　　Patented Sept. 12, 1916.

Application filed May 4, 1916.　Serial No. 95,396.

*To all whom it may concern:*

Be it known that I, WILLIAM N. BEST, a citizen of the United States, and resident of New York, borough of Brooklyn, in the county of Kings and State of New York, have invented certain new and useful Improvements in Children's Vehicles, of which the following is a specification.

This invention relates to certain improvements in children's vehicles and has for its main object to provide a vehicle which the child himself may propel or which may be drawn by another person and steered either by the child or the person drawing it.

My improved vehicle may be constructed of metal, wood or any other suitable material, although I preferably form it of metal, and the parts may be varied in detail without departing from the spirit of my invention.

In the accompanying drawings, to which reference is to be had and in which similar reference characters indicate corresponding parts in the several views, I have illustrated merely one embodiment of my invention.

In these drawings, Figure 1 is a side elevation of a vehicle constructed in accordance with my invention, the handle or draft bar being shown in dotted lines in a second position which it may occupy; Fig. 2 is a top plan view; Fig. 3 is a front elevation; and Figs. 4 and 5 are sectional details of certain of the parts.

In the specific construction illustrated, the body 10 of the vehicle is formed of comparatively stiff sheet metal and includes a rear or seat portion 11 and a front portion 12. Between these two portions is a connecting portion 13 of reduced width. Upon opposite sides of this connecting portion there are thus formed recesses or apertures through which the child's legs may extend while the child is seated on the rear or seat portion 11. The sheet of metal forming the body portion preferably has a depending flange extending along its entire periphery so as to reinforce and strengthen the body portion and to also reduce the liability of injury from the edges of the metal.

The body 10 is supported at the rear end by an axle 14 having wheels at opposite ends, the axle being connected to the vehicle by a pair of brackets 15 formed of metal bars. These wheels may be of any suitable character but they are preferably provided with rubber or other cushioned tires and are constructed without spokes so as to reduce the liability of the child catching and injuring his fingers. The body portion of each wheel is formed of two dished plates connected to a sleeve at the center and rigidly secured together adjacent to their peripheries. Their peripheral edges may be spaced a slight distance apart so as to form a channel to receive the tire.

At the front end of the vehicle, a steering post 16 extends vertically through the body portion and is held against vertical movement therethrough by a pair of collars 17 and 18 secured to the steering post by suitable pins extending into the latter. One of these collars engages with the upper surface of the body and the other with the lower surface so as to permit free rotation of the steering post but prevent longitudinal movement. The steering post has a suitable steering handle or steering wheel 19 at its upper end and a fork 20 at the lower end supporting a wheel 21.

The portion of the body at opposite sides of the steering post is bent upwardly as is shown particularly in Fig. 3 so as to form two flanges or ridges 22 spaced from the steering post a sufficient distance to permit the child to place his feet or legs on the body between the flanges 22 and the steering post if he desires. These flanges serve to prevent any liability of the child's feet slipping off sidewise, particularly in case the child be comparatively young.

As previously stated, the child may extend his feet down through the body at opposite sides of the narrow portion 13 and by engagement of his feet with the ground he may propel the vehicle while guiding it by means of the steering handle 19. In case it is desired to draw the vehicle, while the vehicle is being steered either by the child or by the person drawing it, I provide a tongue or draft handle 23. This has jaw portions 24 adapted to engage with opposite sides of the steering wheel above the fork and beneath the body. The steering post at this point is provided with outwardly extending projections 25 preferably formed as the ends of a transversely extending pin. The jaws of the handle are provided with apertures and slots extending up to the apertures so that the handle may be readily removed from or engaged with these projections.

Rigidly secured to the upper surface of the body and directly in front of the steering post 16 is a bracket 26 having a transverse pin forming outwardly extending projections 27 corresponding to the parts 25. The draft handle may be readily disengaged from the projections 25 and caused to engage with the projections 27 so that a person may draw the vehicle without guiding it. With the handle in this position, that is the position shown in dotted lines in Fig. 1, it will be necessary for the child to guide the vehicle himself.

From the foregoing, it will be seen that the draft handle 23 may be entirely removed and the child may propel the vehicle by his feet and steer it with his hands, or he may rest his feet on the body at opposite sides of the steering wheel and guide the vehicle while someone else draws it or he may be relieved of all control over the vehicle and the person drawing it may also guide it.

The vehicle is preferably provided with a removable back rest 29 which it is desirable to use when the vehicle is being drawn by another person. In the specific form illustrated, this back rest includes a light, curved, reticulated wall or basket construction having its lower edge adapted to engage with the upper surface of the seat portion of the body and to approximately follow the contour of the rear and side edges of the latter. As shown, this wall extends substantially vertically although it may extend at any angle desired. To insure the rigid retention of the back rest and to facilitate its easy removal, the side portions are provided with downwardly and forwardly extending lugs 30 adapted to extend through apertures in the body and project forwardly beneath the body in advance of the apertures. In the center, at the rear, the wall is provided with a lug 31 adapted to extend downwardly through an aperture in the rear of the body portion.

In placing the back rest in position, the lugs 30 are inserted through the corresponding apertures, while the inner portion of the back rest is raised above the body. The back rest is then swung downwardly about the lugs 30 as pivots until the lug 31 enters its aperture. With the parts in this position, the front edge of the back rest cannot be directly raised and the child may lean back against it without any danger of a loosening or accidental dislocation of the back rest.

To permit the vehicle to be readily drawn without using the handle 23, I provide means whereby a cord may be readily attached to the vehicle. As shown, the flange at the extreme front end of the body is provided with an aperture 32 and the steering post at a point below the body is provided with an aperture 33. A cord may be readily tied in either of these apertures or an ordinary hook at the end of a cord may be inserted in either aperture and the vehicle may be drawn and may be steered by the person drawing or by the child on the vehicle, dependent upon the particular aperture to which the cord is attached.

In case the child outgrows the vehicle or if for any reason it is desired to vary the elevation of the body 10 above the ground, the desired results may be very readily secured. The steering post 16 is provided with means whereby the collars 17 and 18 may be secured in position at spaced points materially above the position indicated in the drawing. As shown, the steering post has a pair of apertures 34 adapted to receive pins for holding the two collars. To raise the rear of the vehicle, the brackets 15 may be readily unbolted from the body and spaced blocks 35 of any suitable character may be bolted in place between the horizontally turned ends 36 of the upper portions of the brackets and the under surface of the body as shown particularly in Fig. 4. By means of these adjustments both ends of the vehicle may be raised and the front end may be made higher or lower than the rear end if desired.

Having thus described my invention, what I claim as new and desire to secure by Letters Patent is:

A child's vehicle, including a body formed of a single piece of sheet metal and including a rear or seat portion, a front or leg supporting portion and an intermediate connecting portion of materially less width than the front or rear portions, said sheet metal being bent downwardly along its periphery to form a depending marginal flange and said front portion being bent upwardly to form two forwardly and rearwardly extending, substantially parallel beads or ridges spaced apart along opposite sides and adjacent to the upper edges of said marginal flange, and a steering post extending through said front portion between and spaced from said beads or ridges.

Signed at New York, in the county of New York, and State of New York this third day of May, A. D. 1916.

WILLIAM N. BEST.